(12) United States Patent
Luh

(10) Patent No.: US 6,286,618 B1
(45) Date of Patent: Sep. 11, 2001

(54) MILOMETER DEVICE

(75) Inventor: Tai-Yang Luh, Taichung Hsien (TW)

(73) Assignee: Jenn Jianq Co. Ltd., Taichung Hsien (TW)

( * ) Notice: Subject to any disclaimer, the term of this patent is extended or adjusted under 35 U.S.C. 154(b) by 0 days.

(21) Appl. No.: 09/621,390

(22) Filed: Jul. 21, 2000

(51) Int. Cl.⁷ ................................ B62D 21/00; G01P 1/02

(52) U.S. Cl. .................... 180/312; 180/219; 116/62.1; 73/493

(58) Field of Search .................................. 180/312, 219; 116/62.1; 73/1.37, 488, 493, 530, 531, 532

(56) References Cited

U.S. PATENT DOCUMENTS 5,495,758 * 3/1996 Griffen et al. .................. 73/493

* cited by examiner

Primary Examiner—Paul N. Dickson
(74) Attorney, Agent, or Firm—Alan Kamrath; Rider, Bennett, Egan & Arundel, LLP

(57) ABSTRACT

An engine has a drive shaft fastening a first sprocket wheel. A transmission gear box is disposed on a vehicle frame. The transmission gear box has a driven shaft fastening a second sprocket wheel. A chain surrounds the first sprocket wheel and the second sprocket wheel. A hexagonal nut is disposed on the driven shaft. A milometer device is disposed on the driven shaft. The drive shaft is disposed on a transmission gear box. A bolt fastens the milometer device and the hexagonal nut together.

1 Claim, 6 Drawing Sheets

MILOMETER DEVICE

BACKGROUND OF THE INVENTION

The present invention relates to a milometer device. More particularly, the present invention relates to a milometer device which can be detached and replaced easily.

Referring to FIGS. 1 and 2, a conventional milometer device has a mileage recorder 30 having a rotor 31, a first pinion 24 engaging with the rotor 31, a second pinion 24a engaging with the first pinion 24, a first gear 23 engaging with the second pinion 24a, and a second gear 23a engaging with the first gear 23. The second gear 23a is disposed on a transmission gear box 20. An engine 10 has a drive shaft 11 fastening a first sprocket wheel 12. The transmission gear box 20 has a driven shaft 11 fastening a second sprocket wheel 22. A chain 13 surrounds the first sprocket wheel 12 and the second sprocket wheel 22. Since the mileage recorder 30 is disposed in the transmission gear box 20, the transmission gear box 20 should be detached in order to replace a broken mileage recorder 30.

SUMMARY OF THE INVENTION

An object of the present invention is to provide a milometer device which can be detached and replaced easily.

Accordingly, an engine has a drive shaft fastening a first sprocket wheel. A transmission gear box is disposed on a vehicle frame. The transmission gear box has a driven shaft fastening a second sprocket wheel. A chain surrounds the first sprocket wheel and the second sprocket wheel. A hexagonal nut is disposed on the driven shaft. The hexagonal nut has a center hole. A driven shaft is disposed on a transmission gear box. A milometer device is disposed on the driven shaft. The milometer device comprises a mileage recorder having a hollow post and a round through hole communicating with the hollow post, a hollow disk disposed on the hollow post, a washer disposed on the hollow disk, a C-shaped retainer ring disposed on the washer and enclosing the hollow post, and a sleeve inserted in the mileage recorder. The sleeve has a hexagonal hole and two click recesses. The hexagonal hole of the sleeve receives the hexagonal nut. The hollow disk has two click protrusions inserted in the click recess of the sleeve. A positioning bar is disposed on the vehicle frame. A positioning plate has a circular hole matching the round through hole of the mileage recorder, and a circular aperture matching the positioning bar. A screw fastens the positioning plate and the positioning bar together. A flush nut engages with the screw. A bolt fastens the positioning plate, the mileage recorder, and the hexagonal nut together via the circular hole of the positioning plate, the round through hole of the mileage recorder, and the center hole of the hexagonal nut.

DETAILED DESCRIPTION OF THE INVENTION

Figure 1:
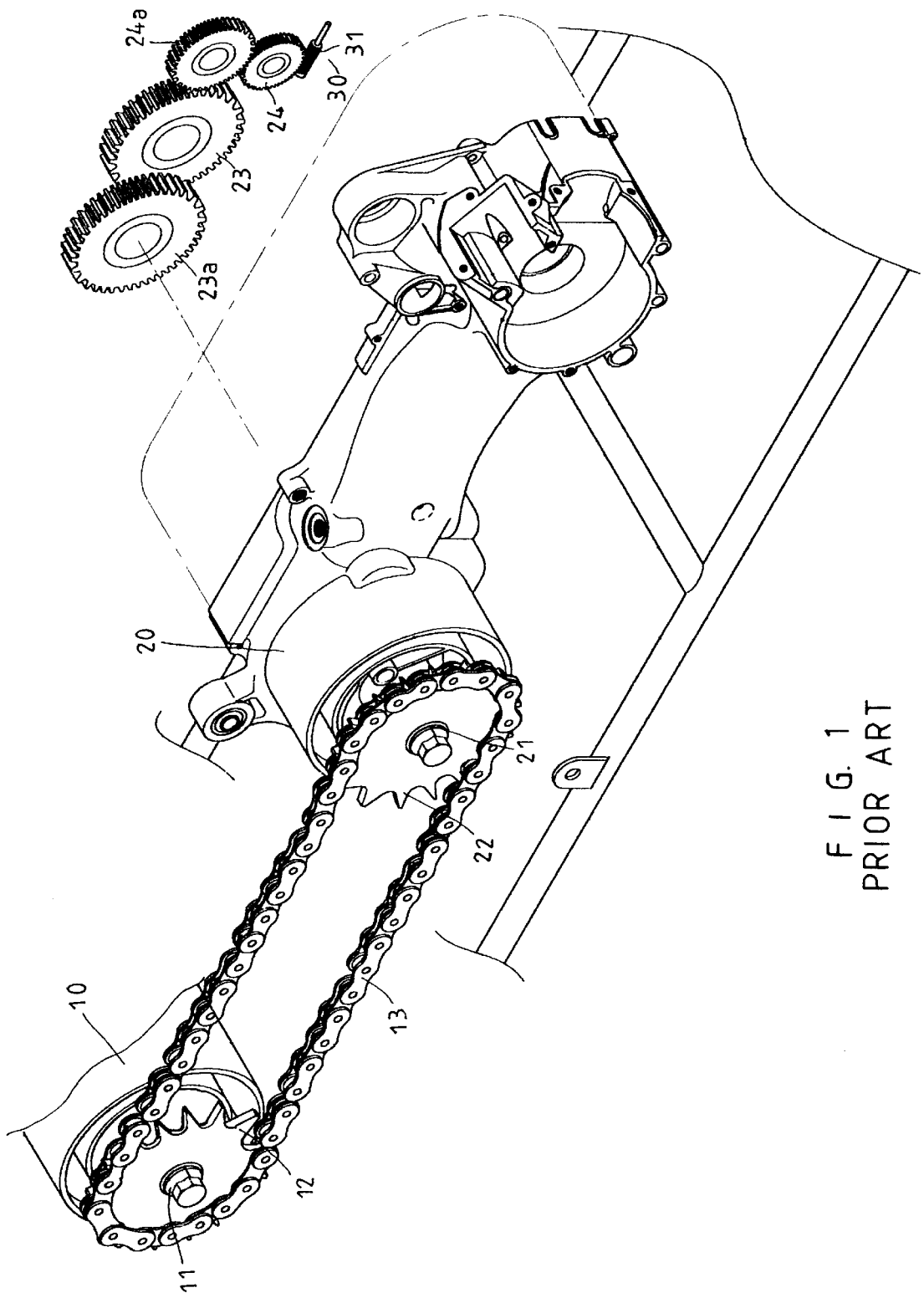
FIG. 1 is a perspective exploded view of a conventional milometer device of the prior art.
Figure 2:
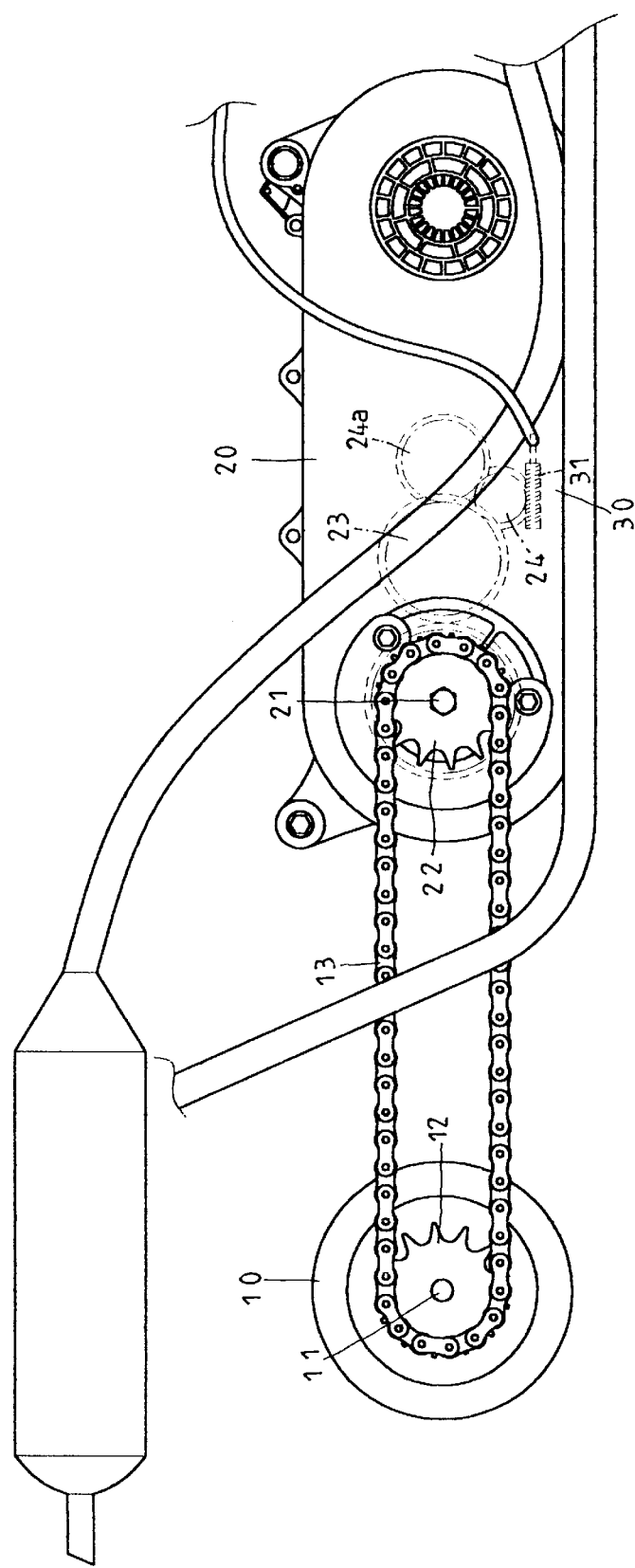
FIG. 2 is an elevational view of a conventional milometer device of the prior art disposed in a vehicle.
Figure 3:
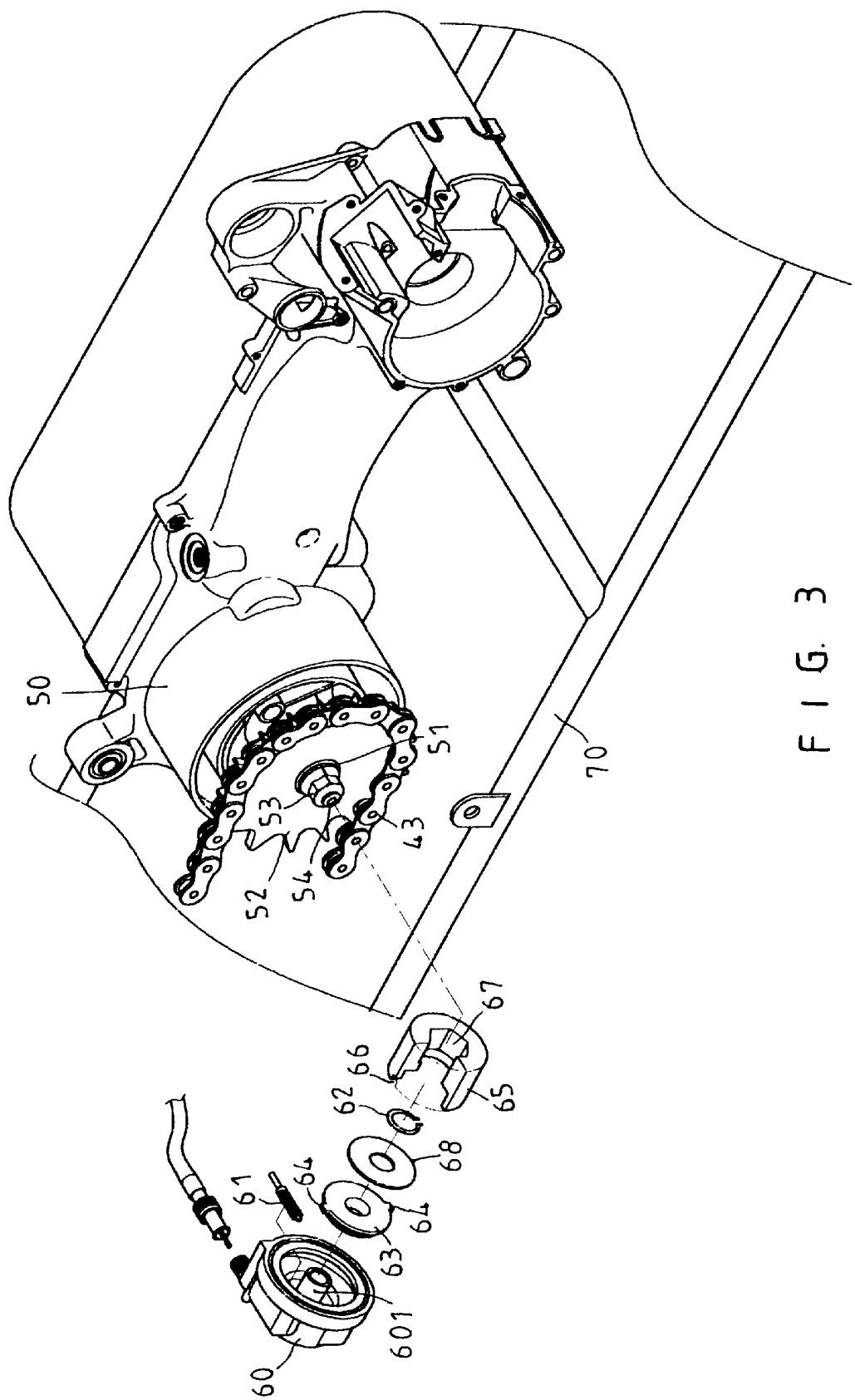
FIG. 3 is a perspective exploded view of a milometer device of a preferred embodiment in accordance with the present invention.
Figure 3A:
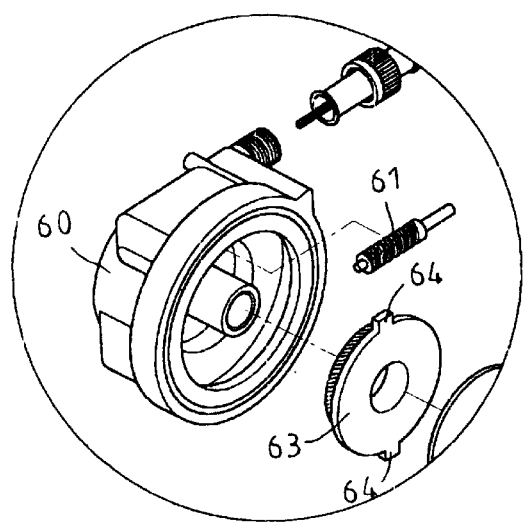
FIG. 3A is an enlarged view of a mileage recorder of a preferred embodiment in accordance with the present invention.
Figure 3B:
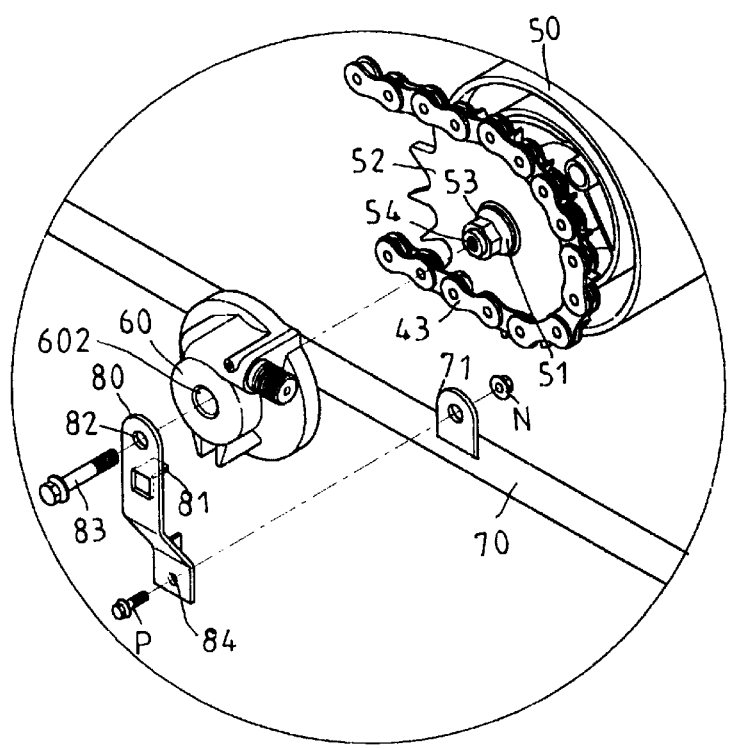
FIG. 3B is a partially perspective exploded view of a milometer device of a preferred embodiment in accordance with the present invention.
Figure 4:
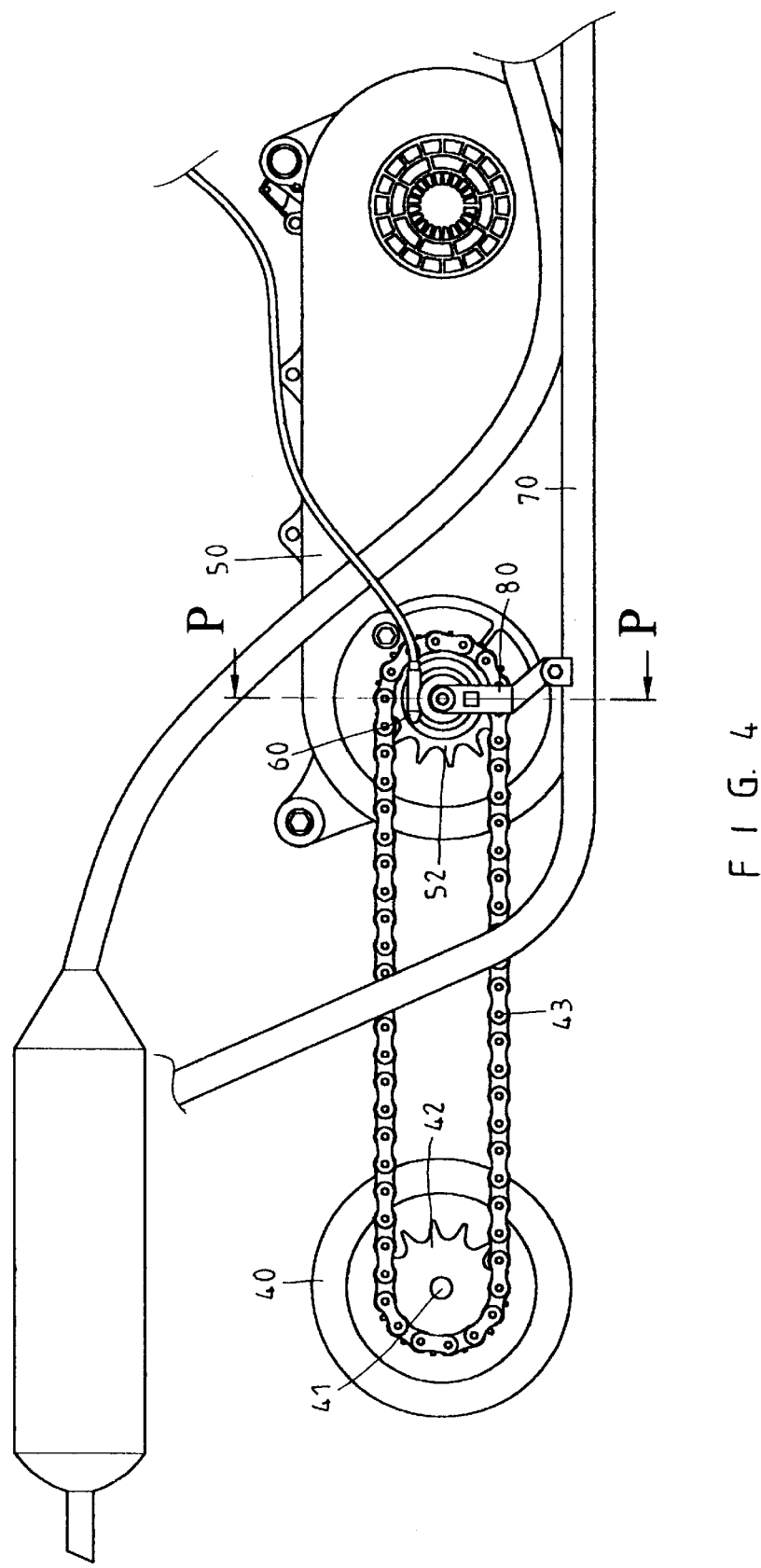
FIG. 4 is an elevational view of a milometer device of a preferred embodiment disposed in a vehicle.
Figure 5:
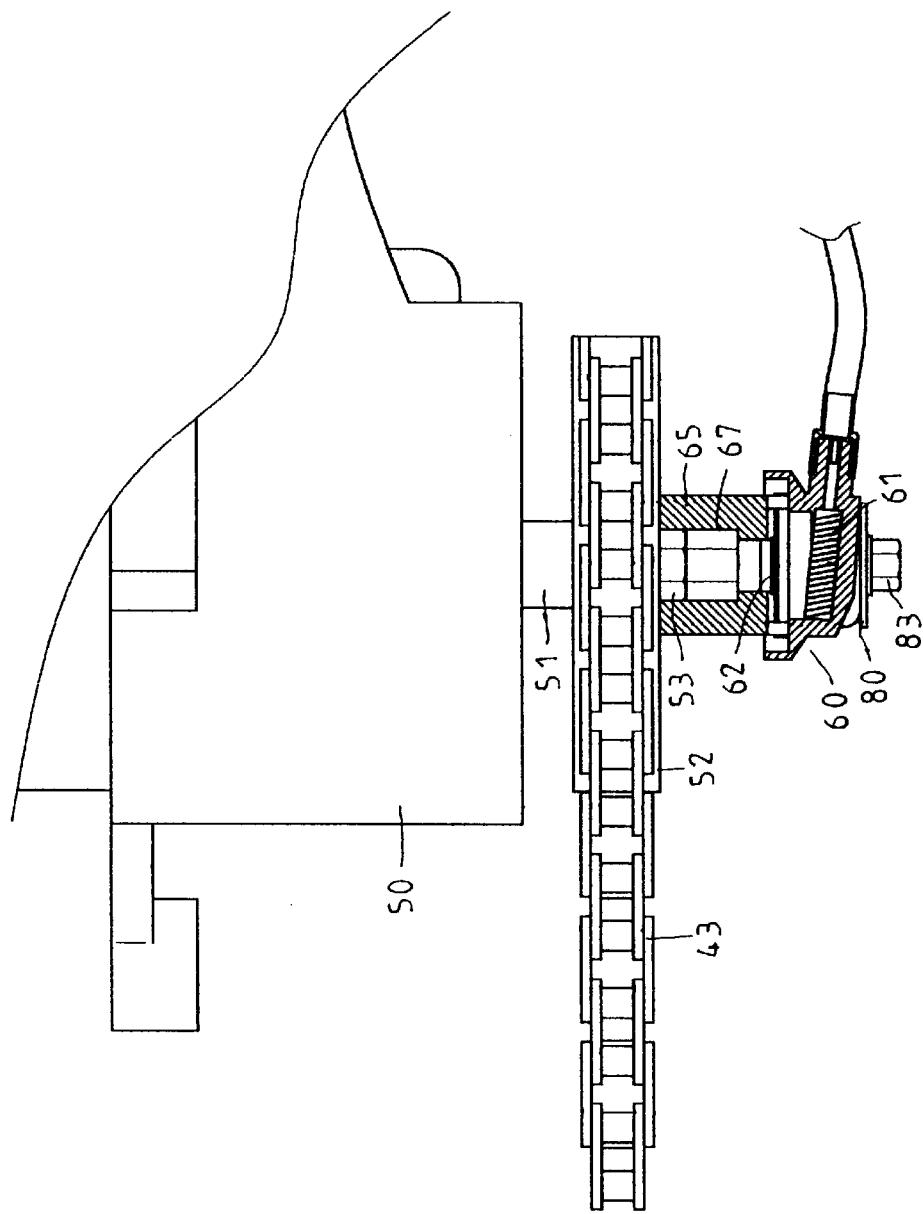
FIG. 5 is a sectional assembly view of a milometer device of a preferred embodiment in accordance with the present invention.

Referring to FIGS. 3 to 5, an engine 40 has a drive shaft 41 fastening a first sprocket wheel 42. A transmission gear box 50 is disposed on a vehicle frame 70. The transmission gear box 50 has a driven shaft 51 fastening a second sprocket wheel 52. A chain 43 surrounds the first sprocket wheel 42 and the second sprocket wheel 52.

A hexagonal nut 53 is disposed on the driven shaft 51. The hexagonal nut 53 has a center hole 54.

A milometer device is disposed on the driven shaft 51. The driven shaft 51 is disposed on a transmission gear box 50.

The milometer device comprises a mileage recorder 60 having a hollow post 601 and a round through hole 602 communicating with the hollow post 601, a rotor 61, a hollow disk 63 disposed on the hollow post 601, a washer 68 disposed on the hollow disk 63, a C-shaped retainer ring 62 disposed on the washer 68 and enclosing the hollow post 601, and a sleeve 65 inserted in the mileage recorder 60.

The sleeve 65 has a hexagonal hole 67 and two click recesses 66.

The hexagonal hole 67 of the sleeve 65 receives the hexagonal nut 53.

The hollow disk 63 has two click protrusions 64 inserted in the click recess 66 of the sleeve 65.

A positioning bar 71 is disposed on the vehicle frame 70.

A positioning plate 80 has a circular hole 82 matching the round through hole 602 of the mileage recorder 60, a circular aperture 84 matching the positioning bar 71, and a click bar 81.

A screw P fastens the positioning plate 80 and the positioning bar 71 together. A flush nut N engages with the screw P.

A bolt 83 fastens the positioning plate 80, the mileage recorder 60, and the hexagonal nut 53 together via the circular hole 82 of the positioning plate 80, the round through hole 602 of the mileage recorder 60, and the center hole 54 of the hexagonal nut 53.

The invention is not limited to the above embodiment but various modification thereof may be made. Further, various changes in form and detail may be made without departing from the scope of the invention.

I claim:

1. An engine having a drive shaft fastening a first sprocket wheel, a transmission gear box disposed on a vehicle frame, the transmission gear box having a driven shaft fastening a second sprocket wheel, and a chain surrounding the first sprocket wheel and the second sprocket wheel, characterized in that:

a hexagonal nut is disposed on the driven shaft, the hexagonal nut has a center hole, a milometer device is disposed on the driven shaft, the milometer device comprising a mileage recorder having a hollow post and a round through hole communicating with the hollow post, a hollow disk disposed on the hollow post, a washer disposed on the hollow disk, a C-shaped retainer ring disposed on the washer and enclosing the hollow post, and a sleeve inserted in the mileage recorder, the sleeve has a hexagonal hole and two click recesses, the hexagonal hole of the sleeve receiving the hexagonal nut, the hollow disk having two click protrusions inserted in the click recess of the sleeve, a positioning bar is disposed on the vehicle frame, a positioning plate has a circular hole matching the round through hole of the mileage recorder, and a circular aperture matching the positioning bar, a screw fastens the positioning plate and the positioning bar together, a flush nut engages with the screw, and a bolt fastens the positioning plate, the mileage recorder, and the hexagonal nut together via the circular hole of the positioning plate, the round through hole of the mileage recorder, and the center hole of the hexagonal nut.

* * * * *